United States Patent [19]

Svejkovsky

[11] Patent Number: 5,165,229
[45] Date of Patent: Nov. 24, 1992

[54] THRUSTER SEALING SYSTEM AND APPARATUS

[75] Inventor: Paul A. Svejkovsky, Webster, Tex.

[73] Assignee: The United States of America as represented by the Administrator of the National Aeronautics and Space Administration, Washington, D.C.

[21] Appl. No.: 780,512

[22] Filed: Oct. 22, 1991

[51] Int. Cl.⁵ .................... F02K 9/96; B65D 39/12
[52] U.S. Cl. ....................... 60/271; 60/223; 60/259; 60/39.091
[58] Field of Search ............ 60/271, 257, 259, 223, 60/39.091; 220/237, 236, 235, 234; 102/202, 381; 239/254.11

[56] References Cited

U.S. PATENT DOCUMENTS

| | | | |
|---|---|---|---|
| 3,372,548 | 3/1968 | Mathis et al. | 239/265.11 |
| 3,693,831 | 9/1972 | West | 60/271 |
| 3,946,557 | 3/1976 | Macbeth | 60/253 |
| 4,773,474 | 9/1988 | Stay | 165/76 |
| 5,007,236 | 4/1991 | Myers et al. | 102/202 |

FOREIGN PATENT DOCUMENTS 0223977 1/1943 Switzerland ............ 102/381

Primary Examiner—Richard A. Bertsch
Assistant Examiner—L. Jalali
Attorney, Agent, or Firm—Hardie R. Barr; Guy M. Miller; Edward K. Fein

[57] ABSTRACT

A thruster nozzle sealing system and apparatus is provided for protection of spacecraft thruster motors. The system includes a sealing plug, a sealing plug insertion tool, an outer cover, an outer cover attachment, a ferry flight attachment, and a test stand. The sealing plug prevents moisture from entering the thruster engine so as to prevent valve failure. The attachments are interchangeably connectable with the sealing plug. The ferry flight attachment is used during air transportation of the spacecraft, and the outer cover attachment is used during storage and service of the spacecraft. The outer cover provides protection to the thruster nozzle from mechanical damage. The test stand provides a means for testing and certifying the operating condition of each component of the system.

19 Claims, 4 Drawing Sheets

THRUSTER SEALING SYSTEM AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The invention relates to system and apparatus for protecting thruster engines and, more particularly, relates to mechanisms for providing air tight sealing of the thruster nozzle, for mechanically protecting the nozzle, and for servicing of the thruster engine with the sealing mechanisms installed.

BACKGROUND ART

During space flights by the U.S. Space Shuttle, it is known that Primary Reaction Control System (PRCS) Thruster Engines have experienced failure. The cause of failure has been traced to moisture entering the oxidizer valves within the thruster engines. The cost of repairing one or two thrusters per flight is estimated to range from one-half to one million dollars. Each Shuttle has 38 thrusters, and additional failures could become a serious flight safety hazard.

U.S. Pat. No. 3,946,557 to A. W. Macbeth discloses a gas tight seal for a rocket motor nozzle using a plug in the throat of the nozzle. The plug is formed by filling an elastomeric bag with a plastic foam that may cured in situ to conform to the contour of the throat. After the foam has cured, the bag is sealed. This device, while recognizing the problem in leaving the nozzle unsealed, has a number of shortcomings which make it impractical for use with the Shuttle. Installation time and difficulty would be a problem because the Shuttle thruster nozzles need to be sealed almost immediately upon landing. Also difficulties are presented in servicing the thruster engine through the plug when such servicing requires evacuation or pressurization of the thruster engine. The Macbeth device discloses that servicing may be done through the plug, although no details are given and the disclosed device does not include this capability. No provision is made for pressures which may build up within the engine and suddenly expel the plug. Moisture may already be present within the sealed part of the thruster engine prior to emplacement of the plug, so that damage could occur in spite of an air tight seal. It is also not clear if the Macbeth plug is mechanically sturdy enough to ensure that the seal would remain in place when the Shuttle is transported via aircraft.

U.S. Pat. No. 4,773,474 to K. E. Stay discloses a snap-on fillerneck assembly for a tank which uses resilient fingers around a body to latch onto an interior neck, thereby holding the fillerneck assembly in place after the flexible fingers expand radially outward upon being pushed through the neck. A removable lock ring having a diameter approximately equal to the inner diameter of the body is inserted into the body and into engagement with interior ledges on the fingers, thereby blocking inward movement of the fingers. The Stay invention does not disclose how such a mechanism could be applied for use in sealing a thruster nozzle. The surface of the thruster nozzle typically has a coating which would be damaged if it were chipped or scratched by such flexible fingers. Also, while the thruster nozzle has a throat portion, the inner surfaces are rather smooth and present no sharp edges to provide latching in the manner disclosed in the Stay invention. Another problem with the Stay device is the absence of mechanisms for plug expulsion if the plug is accidentally left in place when the spacecraft is launched, while concurrently enabling the plug to maintain a seal at relatively high pressures when the engine was being serviced.

The disadvantages of the prior art are overcome by the present invention, and a relatively simple and cost effective thruster nozzle sealing system and apparatus are hereinafter disclosed for protecting rocket thruster engines during storage, transportation, and servicing of a spacecraft. Those skilled in the art have long sought and will appreciate the novel features of the present invention which solve these and other problems.

STATEMENT OF THE INVENTION

The thruster nozzle sealing system and apparatus comprises components which can be assembled in several different configurations to do a variety of jobs.

A special thruster nozzle throat sealing plug is utilized for plugging and sealing the throat of a thruster nozzle to prevent moisture or other foreign substances from entering and accumulating inside a thruster engine. A low pressure relief valve is incorporated within the plug to prevent pressures from building up within the thruster motor. This relief valve may be disabled to allow servicing the thruster motor by pressurization or evacuation. Flexible fingers made of a deformable material anchor the plug within the nozzle without damaging the surface of the nozzle. An O-ring seals the throat during low pressures which are maintained by the relief valve, and also mechanically supports the sealing plug so that the flexible fingers typically experience no load and thus enhance plug life. The plug is designed to have a multiple pressure release mechanism so that the plug will release from the nozzle at different pressures depending on the particular circumstances. A fail-safe overpressure protection mechanism is also included which will vent the thruster motor if, for instance, the relief valve fails and an overpressure condition occurs. A sealing plug installation tool is provided for safely and expediently installing and removing the sealing plug.

A ferry flight vent attachment connects to the sealing plug and prevents moisture from entering the nozzle when the low pressure relief valve within the sealing plug vents. The ferry flight vent attachment is easily and quickly attachable to the sealing plug prior to transporting the spacecraft by air.

For general storage and servicing of the thruster engine, an outer cover attachment and a corresponding outer cover is employed. The outer cover protects the thruster nozzle from mechanical damage during the many phases of Orbiter servicing. The outer cover attachment provides a spring-loaded fitting which maintains a constant force on the outer cover holding it in place, and provides a fitting for servicing the thruster motor. It can be used for enabling and disabling of the relief valve within the sealing plug. The outer cover attachment contains a higher pressure relief valve so that service pressure applied to the thruster motor will not be excessive. It also contains an orifice to regulate flow through this relief valve to its rated capacity.

A test stand is utilized for certification and acceptance testing of the sealing plug and other components of the nozzle sealing system. The test stand, when connected to auxiliary electrical, vacuum and pressure sources, measures throat plug insertion/removal forces, relief valve cracking pressures, and leakage rates at both vacuum and pressure.

Accordingly, it is an object of the present invention to provide a thruster nozzle sealing system and apparatus which will protect rocket thruster engines during storage, transportation, and servicing of a spacecraft.

A feature of the present invention is the incorporation of a replaceable desiccant to absorb any moisture that was present before installation of the sealing plug.

An advantage of the present device is that it seals air tight to keep moisture out of the thruster valves, while still allowing servicing of the thruster engine.

These and further objects, features, and advantages of the present invention will become apparent from the following detailed description, wherein reference is made to the figures in the accompanying drawings.

While the invention will be described in connection with the presently preferred embodiment, it will be understood that it is not intended to limit the invention to this embodiment. On the contrary, it is intended to cover all alternatives, modifications, and equivalents as may be included in the spirit of the invention and as defined in the appended claims.

DETAILED DESCRIPTION OF THE INVENTION

The present invention forms a novel system for sealing the thruster nozzle of a thruster engine, and may comprise a sealing plug, a sealing plug insertion tool, a ferry flight attachment, an outer cover, an outer cover attachment, and a test stand. The components can be assembled in several different configurations to do a variety of jobs.

Figure 1:
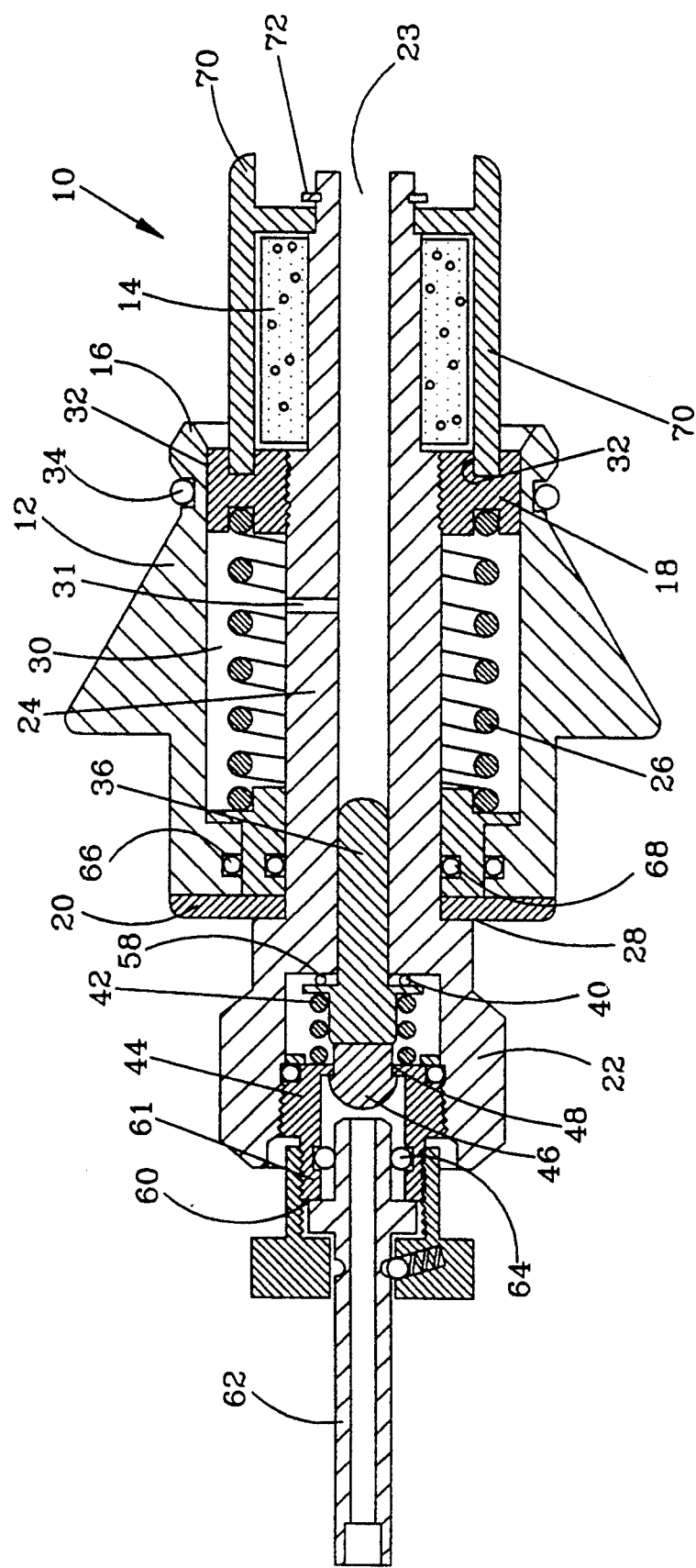
FIG. 1 is an elevational view, in section, of a throat sealing plug assembly in accord with the present invention.
Figure 2:
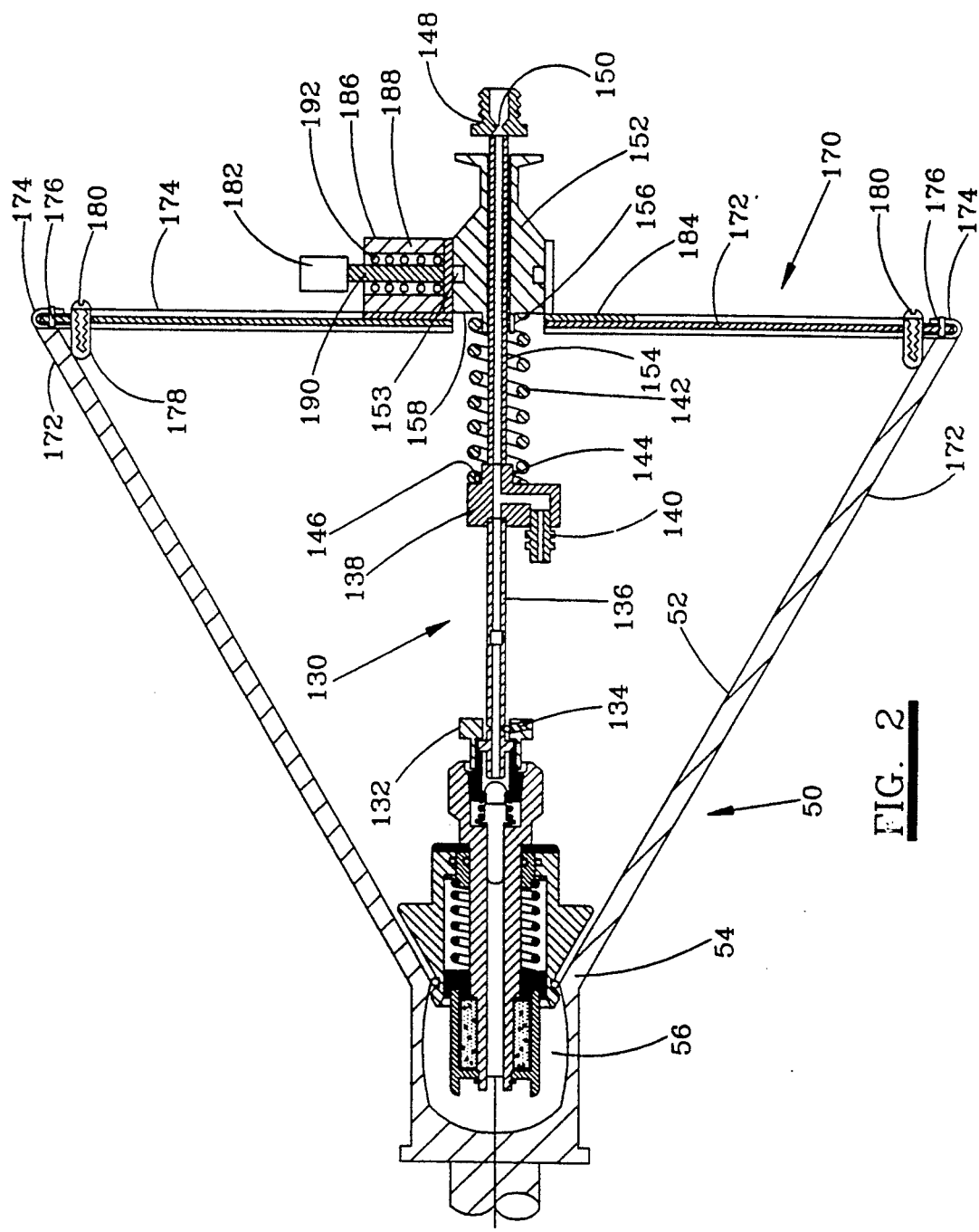
FIG. 2 is an elevational view, in section, of a throat sealing plug, an outer cover attachment and an outer cover in position in a thruster nozzle in accord with the present invention.

The main internal components of sealing plug 10 of the present invention are illustrated in FIG. 1. Housing 12 is, in a preferred embodiment, made of teflon (polytetrafluoroethylene) to prevent damage to thruster nozzle 50 (FIG. 2). Housing 12 may be made from other materials relatively deformable with respect to the interior surface 52 of the thruster nozzle, such as elastomeric or resinous materials including nitriles, styrenebutadiene polymer, neoprene, butyl, polyurethane, polyester, and the polyfluorocarbons. The term deformable is used here to relate to a materials tendency to deform or distort. Deformability may be measured by the amount of reduction in area, level of tensile stress, and amount of elongation that is shown in response to a load. In a notched bar test, deformable specimens have a tendency to bend instead of fracturing, and more deformable materials absorb less energy.

In a preferred embodiment, housing 12 is slotted adjacent O-ring 34 to form flexible fingers 16. Flexible fingers 16 are in a collapsible posture when piston 18 is reciprocated within cavity 30 towards washer 20. Such reciprocation may occur as a result of tension applied to head portion 22 of bolt 24 which is threadably engaged with piston 18. Flexible fingers 16 may then flex radially inward to allow passage of flexible fingers 16 through throat portion 54 of thruster nozzle 50. When tension applied to bolt 24 is released, spring 26 pushes piston 18 away from washer 20 until stop 28 on bolt 24 is reached. This is an expanded position in which piston 18 reinforces inner side 32 of flexible fingers 16 in a radially outward posture, thus locking sealing plug 12 within thruster throat portion 54 (FIG. 2). In a preferred embodiment, the fingers hold sealing plug 10 to a pressure of approximately 200 psig within throat chamber 56 (FIG. 2).

Materials such as teflon (polytetrafluoroethylene) have a tendency to change shape under long term loads due to a phenomena known as cold flow. Since cold flow may ruin the shape of fingers 16, various techniques are used to avoid cold flow. Fingers 16 are sized to fit the contour of thruster throat portion 54 to spread out the load on fingers 16. Also, when there is low pressure (typically less than approximately 5 psig) in thruster throat chamber 56, then O-ring 34 not only seals sealing plug 10 in throat portion 54 but also supports sealing plug 10 so that fingers 16 experience very little or no load. O-ring 34 is soft and fills the pores in the surface of thruster throat portion 54, thereby affecting a fluid-tight seal. In a preferred embodiment, O-ring 34 is made from Kalrez or other suitable elastomeric materials.

In order to prevent pressure build up from thermal changes or leaking propellant valves, a low pressure (approximately 8.5 psig) relief valve may be built into sealing plug 10. This relief valve is comprised of poppet 36, O-ring 40, spring 42, body 44, and screw 46. The relief valve also checks any flow into the thruster. In order to open or disable this relief valve for thruster servicing (evacuating/venting/pressurizing), body 44 is threaded. As body 44 is rotated to move away from washer 20, body neck portion 48 pulls screw 46, which in turn pulls poppet 36 releasing O-ring 40 from seal surface 58. Body 44 has an end portion 60 containing a slot (not shown) that indexes with attachment 62 so that the relief valve can be enabled/disabled by rotating attachment 62. O-rings 64, 66, and 68 seal all leak paths through sealing plug 10.

Desiccant package 14 is secured within basket 70 by retaining ring 72 on bolt 24. Basket 70 is typically comprised of a relatively soft material to protect thruster chamber 56 from damage by bolt 24.

Sealing plug 10 is designed in such a way that if an over pressure occurs within chamber 56 (typically for pressures over 100 psig), sealing plug 10 will slowly move out of thruster throat portion 54 until the airtight seal is broken and the pressure is vented. Sealing plug 10 remains firmly attached to thruster nozzle 50, and this condition is denoted by a visual indicator. The thruster with sealing plug 10 installed can become pressurized by temperature changes, leaking thruster valves, and by deliberate pressurization for servicing through outer cover attachment 130 (FIG. 2). When the thruster is deliberately pressurized, pressure is typically limited to 60 psig by outer cover attachment relief valve 140. If the thruster valves leak, the relief valve built into sealing plug 10 typically limits long term pressure to 8.5 psig. If for some reason this relief valve fails (corrosion, galling, contamination), pressure could increase, possibly to the point of releasing flexible fingers 16 and causing damage to the Shuttle or injury to personnel. The fail-safe over pressurization protection feature prevents this from occurring.

This fail-safe feature is accomplished by utilizing cold flow characteristics of a deformable material, such as polytetrafluoroethylene, and proper sizing of flexible fingers 16. Activation of this fail-safe feature is by a combination of pressure, temperature and time that causes the deformable material of flexible fingers 16 to cold flow where they contact thruster throat portion 54. As cold flow occurs, the complete sealing plug 10 moves slowly out of thruster throat portion 54 until O-ring 34 loses it pressure seal and vents the thruster pressure. As O-ring 34 loses its seal, it pushes sealing plug 10 over to one side giving a visual indication that the seal has been broken. Flexible fingers 16 are sized so that after this cold flow has occurred, there is still sufficient material available to hold sealing plug 10 in thruster nozzle 50. Once the feature has been activated and flexible fingers 16 are permanently damaged, it is only necessary to replace sealing plug housing 12 and faulty relief valve components.

One of the functions of sealing plug 10 is to hold high pressure when the thruster is deliberately being pressurized for servicing. Conversely, a second function of sealing plug 10 is to unlatch at a low pressure and be expelled from the thruster should the Shuttle be inadvertently launched with a plug installed.

The first function, high pressure retention, is accomplished utilizing orifice 31 through bolt 24 within cavity 30. A small orifice 150 is incorporated into outer cover attachment 130 so that when the thruster is deliberately being pressurized, the pressure increases slowly. This allows time for pressure to flow through orifice 31 and pressurize cavity 30 as well as the thruster cavity 56, so that both sides of piston 18 are pressurized. In this slow pressurization mode, sealing plug 10 will typically hold approximately 220 psig before piston 18 is pushed back to release flexible fingers 16 and allow sealing plug 10 to be expelled.

The second function is triggered by the thruster firing (rapid pressurization). In this mode, the full pressure working on the thruster side of piston 18 pushes it back, unlatches flexible fingers 16, and expels sealing plug 10 before the pressure can travel down bolt hole 23 and through orifice 31 to pressurize cavity 30 and equalize pressures acting on piston 18. In a preferred embodiment, unlatching in this mode typically occurs at 60 psig.

Figure 3:
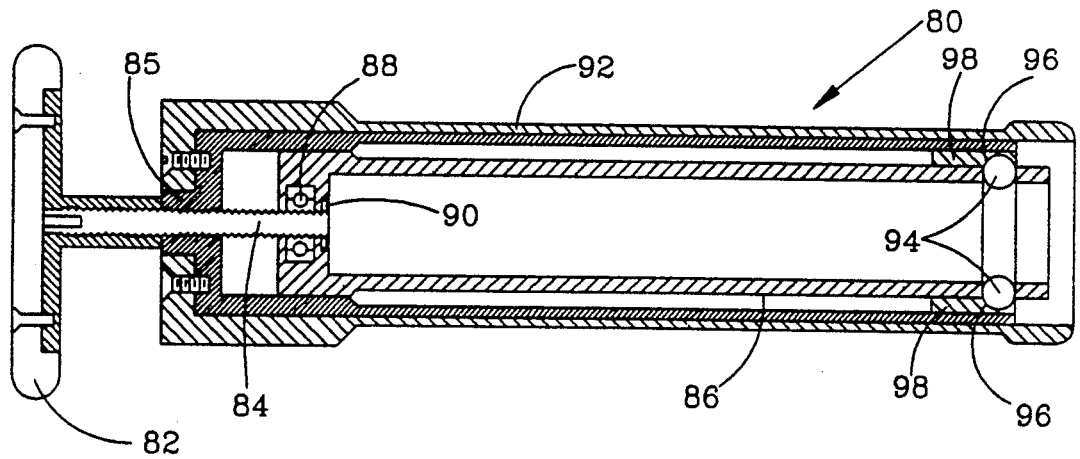
FIG. 3 is an elevational view, in section, of a sealing plug insertion tool in accord with the present invention.

Insertion tool 80 (FIG. 3) grabs head portion 22 of bolt 24 for collapsing flexible fingers 16. In a preferred embodiment, this is accomplished by rotating handle 82. Handle 82 is keyed to threaded shaft 84 so that as handle 82 is rotated it moves with respect to tool cap 85. Threaded shaft 84 is attached to sleeve 86 by bearing 88 and retaining ring 90, which combination reduces friction in the mechanism. As sleeve 86 moves in the direction of handle 82 with respect to body 92, stainless steel balls are forced inwardly due to inclines 96 on end piece 98. These balls grab head portion 22 of bolt 24. Further rotation of handle 82 pulls bolt 24 and piston 18 in the direction of handle 82. As threaded shaft 84 approaches the end of its travel, a groove (not shown) is exposed on threaded shaft 84, giving a visual indication that sealing plug 10 is ready for installation. After sealing plug 10 has been installed in thruster nozzle 50 (FIG. 2), turning handle 82 in the opposite direction forces flexible fingers 16 outward locking sealing plug 10 in throat portion 54. Further rotation of handle 82 allows steel balls 94 to move outward, releasing insertion tool 80 from sealing plug 10. Insertion tool 80 is covered with a deformable material to avoid damage to thruster 50. A wrist strap (not shown) may be used with insertion tool 80 to prevent accidental dropping of insertion tool 80.

Figure 4:
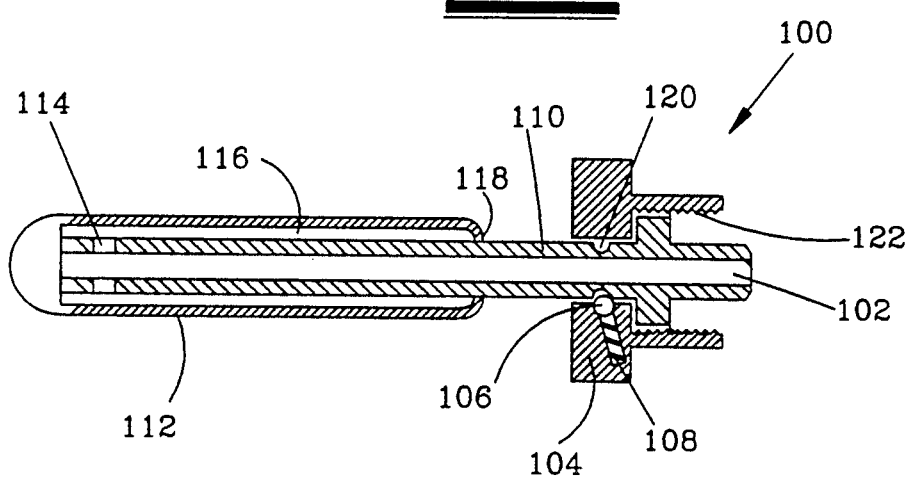
FIG. 4 is an elevational view, in section, of a ferry flight attachment in accord with the present invention.

Ferry flight attachment 100 (FIG. 4) is typically connected to fitting 61 (FIG. 1) immediately after landing and after sealing plug 10 has been installed in thruster nozzle 50. Ferry flight attachment is installed in place of outer cover attachment 130, which is shown installed in sealing plug 10 in FIG. 2. The thruster nozzle sealing system is assembled in this configuration during the air transport or ferry flight of the space ship. The purpose of ferry flight attachment 100 is to prevent water and/or dust from entering the thruster as might occur if, for instance, the relief valve in sealing plug 10 vents when water is standing in thruster nozzle 50. Annulus 116 is formed between body 110 and sleeve 112. A flow path is created from sealing plug 10 past poppet 36 into bore 102 through body 110, and through holes 114, annulus 116, and holes 118.

Threaded nut 104 is used to secure ferry flight attachment 100 to fitting 61. Threaded nut 104 has a ball 106 that is biased by spring 108 into detent 120 in body 110. Ball 106 only encounters detent 120 as it reaches the end of its threads 122. The resistance created by spring-loaded ball 106 in detent 120 prevents nut 104 from backing off during the vibration of the ferry flight. When threaded nut 104 is backed off, spring-loaded ball 106 comes out of detent 120 and rides on the smooth surface of body 110. The spring-loaded ball 106 holds nut 104 out of the way during insertion of ferry flight body 100 past O-ring 64. Also, due to spring-loaded ball 106 riding on the smooth surface of body 110, cross-threading of thread 122 is easily prevented.

Referring to FIG. 2, outer cover attachment 130 is attached to sealing plug 10 in an identical manner as was ferry flight attachment 100, using an identical threaded nut 132 with spring-loaded ball 134. The length of tube 136 varies to accommodate different thruster configurations. Tube 136 is typically welded to housing 138 that provides mounting for relief valve 140 which limits the pressure that can be applied to thruster cavity 56 to a preferred amount of approximately 60 psig. Housing 138 also provides mounting for one end of spring 142 by means of threaded boss 144 and shoulder 146. Fitting 148 includes an orifice 150 which limits flow capacity through the fitting to that of the poppet relief valve 140. Fitting plug 152 is slidably mounted on tube 154 and is attached to the other end of spring 142 by means of threaded boss 156 and shoulder 158. Spring 142 provides the force that holds outer cover 170 in place. Due to the mounting method of spring 142, there are no protruding sharp spring ends. The size and pitch of the thread on threaded bosses 156 and 144 is such that, once spring 142 is screwed on, it becomes self-locking and cannot be removed by rotating either boss 156 or boss 144 up to the limits of spring 142. Spring 142 can be removed by lifting the end of spring 142 with an appropriate tool and unscrewing it. The ends of spring 142 are secured against shoulders 146 and 158 so there are no protruding sharp ends. Since spring 142 is firmly attached at both ends, spring 142 can work in both directions and precisely locate fitting plug 152 when spring 142 is in the relaxed position. Fitting 148 prevents overextension of spring 142.

Figure 5:
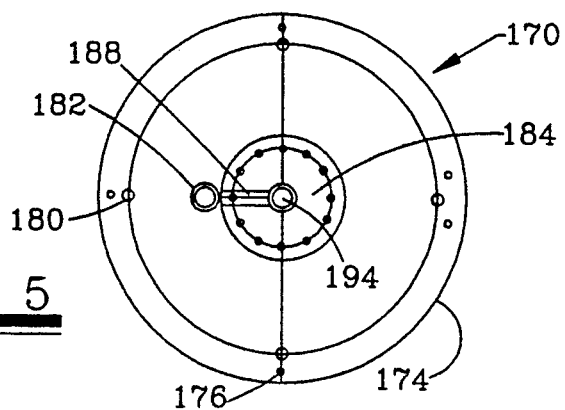
FIG. 5 is a elevation top view of an outer cover in accord with the present invention.
Figure 6:
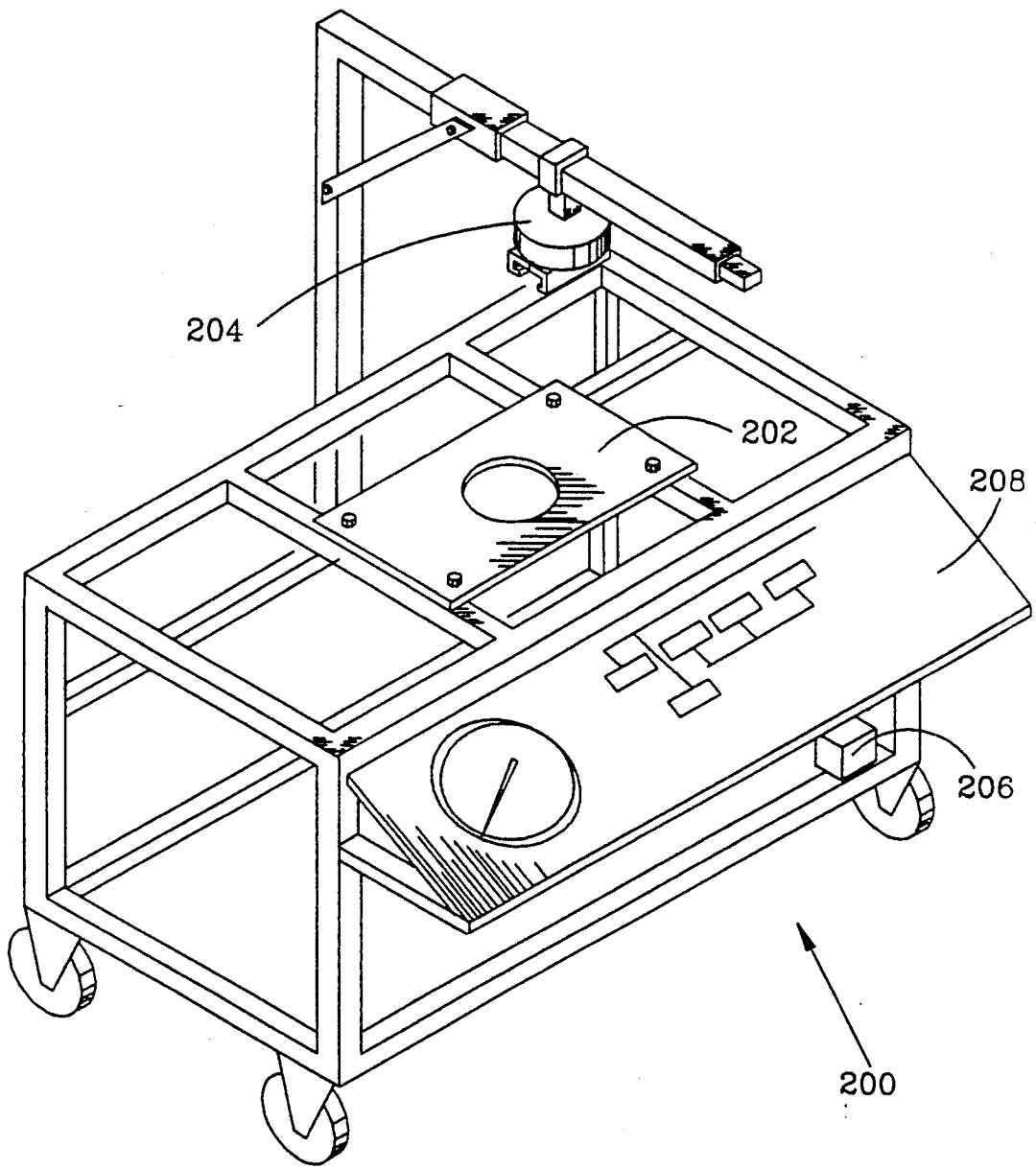
FIG. 6 is a perspective view of a test stand in accord with the present invention.

Outer cover 170 shown installed in FIG. 2, with an alternate view shown in FIG. 5, performs two basic functions. Its primary function is to protect thruster nozzle 50 from mechanical damage during the many phases of Orbiter servicing. A second function is to carry any side loads that might be applied to outer cover attachment 130 by servicing devices, such as flexible hoses. In a preferred embodiment, stainless steel centerpiece 172 is surrounded by deformable body 174 which may be made from materials discussed hereinbefore, such as teflon (polytetrafluoroethylene), and which is held in place by roll pins 176. Four relatively deformable locators 178 are mounted to centerpiece 172 by screws 180. With this arrangement, only relatively deformable parts body 174 and locators 178 ever come in contact with the thruster nozzle 50, thereby preventing scratching or chipping. Center piece 184 contains latch 186 made of latch housing 188, plunger 190, spring 192, and ring handle 182. Spring 192 forces plunger 190 into groove 153 when fitting plug 152 is pulled through hole 194 in outer cover 170, thereby latching outer cover 170 in place. Spring 142 maintains a constant force on outer cover 170 holding it in place. In the configuration shown in FIG. 2, outer cover attachment 130 can be rotated to activate or deactivate the poppet relief valve 36 in sealing plug 10. Thruster evacuation or pressurization is accomplished by connection to fitting 148 on the end of outer cover attachment 130. Outer cover 170 is easily removed by pulling ring handle 182 outward, causing latch 186 to unlatch.

There are ten different thruster configurations at the present time. FIG. 2 shows a "square cut" while nine other thruster configurations are referred to as "scarfed" thrusters. Thruster throat portion 54 and thruster cavity 56 are the same on all ten thruster configurations, so throat plug 10 and ferry flight attachment 100 work on all thrusters without modification. The basic design of outer cover 170 and outer cover attachment 130 works on all ten thruster configurations by changing only a very few parts. On outer cover attachment 130, only the length of tube 136 has to be varied. On outer cover 170, only centerpiece 172, body 174, hole 194, and housing 188 need be changed.

It is necessary that all components of the thruster nozzle sealing system undergo certification and acceptance testing. Additionally, because of the ten year sealing plug life, sealing plugs 10 will be periodically disassembled for cleaning/inspection/O-ring replacement and need to be retested before being put back into service. An expeditious and consistent means of performing these tests is thus desirable. Test stand 200 operated through panel assembly 208 is designed to test each of the five components of the thruster sealing system with either an actual PRCS thruster attached to mounting plate 202, or to a locally fabricated thruster simulator when certain off-limits tests might damage the PRCS thruster. Insertion tool 80 can be manually tested for fitting sealing plug 10, or pneumatic actuator 204 can be used with foot valve 206 leaving both of the operator's hands free for sealing plug 10 manipulation. Sealing plug 10 gripping and actuation is exactly the same with pneumatic actuator 204 as with insertion tool 80. Test stand 200, when connected to auxiliary electrical, vacuum and pressure sources, measures sealing plug insertion/removal forces, relief valve cracking pressures, and leakage rates at both vacuum and pressure.

The thruster nozzle sealing assembly is presently designed to function properly between approximately 15 to 125 degrees fahrenheit, and is completely fuel and oxidizer compatible thereby contributing to safety and long life. The inherent design of sealing plug 10 provides sufficient flexible finger 16 strength to permit repeated two-hour thruster pressurizations to the typical maximum of 60 psig with no sealing plug 10 degradation while providing fail-safe overpressurization protection.

The foregoing description of the invention has been directed in primary part to a particular, preferred embodiment in accordance with the requirements of the patent statutes and for purposes of illustration. It will be apparent, however, to those skilled in the art that many modifications and changes in the specifically described thruster nozzle sealing system and apparatus may be made without departing from the scope and spirit of the invention. Therefore, the invention is not restricted to the preferred embodiment illustrated but covers all modifications which may fall within the scope of the following claims.

What is claimed is:

1. A thruster nozzle sealing plug for sealing off a thruster engine within a thruster throat portion, comprising:

a sealing plug housing having exterior surfaces covered with a deformable material;

a collapsible portion on said sealing plug housing, said collapsible portion having an outside collapsed diameter smaller than the inside diameter of said throat portion of said thruster nozzle for permitting insertion of said collapsible portion through said throat portion of said thruster nozzle;

means for expanding said collapsible portion on said plug housing operative to anchor said sealing plug to said throat portion of said thruster nozzle;

a relief valve operative to relieve pressure buildup within said thruster engine over a relief valve limit pressure; and an elastomeric seal in surrounding relationship with said plug housing, said elastomeric seal being interposed between said collapsible portion of said plug housing and said throat portion, said elastomeric seal supporting said plug and preventing contact between said plug housing exterior and said thruster nozzle surface when pressure within said thruster engine is less than said relief valve limit pressure.

2. The apparatus of claim 1, wherein said collapsible portion of said plug housing comprises:

flexible fingers integral with and surrounding a first end of said sealing plug housing, said fingers being flexible radially outward and inward with respect to said sealing plug housing;

said sealing plug housing having a cavity therein; and a piston reciprocal within said cavity of said plug housing between a first expanded position and a second collapsed position, said piston supporting said fingers in a radially outward posture in said first position and allowing said fingers to move radially inward in said second position.

3. The apparatus of claim 2, further comprising:

a biasing means operative to apply a first pressure against said piston for holding said piston in said first expanded position, said piston moving to said second collapsed position when a second pressure applied to said piston in opposition to said first pressure is greater than said first pressure thereby permitting expulsion of said plug from said thruster nozzle.

4. The apparatus of claim 3, further comprising:

a fluid passage through said sealing plug housing and opening into said cavity, and an orifice within said passage having a restriction such that a slow pressure build up in said thruster engine is communicated to said cavity opposite of said piston from said thruster engine for supplementing said biasing means first pressure to hold said piston in said first expanded position.

5. The apparatus of claim 4, wherein:

said fingers being comprised of a deformable material having a cold flow characteristic which is activated by a slow buildup of an excessive pressure within said thruster engine, said cold flow characteristic causing said flexible fingers outer diameter to slowly decrease and permit said sealing plug to move slowly in a direction away from said thruster engine until said elastomeric seal loses contact with said throat portion, thereby releasing said excessive pressure.

6. The apparatus of claim 1, wherein said relief valve has an enabling position and a disabling position such that said relief valve is inoperative in said disabling position.

7. The apparatus of claim 1, further comprising:

a relief valve fitting in communication with said relief valve; and an attachment removably securable to said relief valve fitting, a bore through said attachment allowing venting of said thruster engine through said attachment by said relief valve.

8. The apparatus of claim 1, further comprising:

a desiccant contained intermediate said thruster engine and said throat portion.

9. A system for sealing a thruster nozzle of a thruster engine, comprising:

a sealing plug for sealing a throat portion of said thruster nozzle, said sealing plug having a collapsible end portion with an outside collapsed diameter permitting insertion of said collapsible portion through said throat portion of said thruster nozzle, said sealing plug having a first bore therethrough;

a removably engageable insertion tool for inserting said sealing plug into said thruster nozzle, said insertion tool including means operative for collapsing said end portion of said plug; and an outer cover attachment removably securable to said sealing plug, said outer cover attachment having a second bore therethrough in communication with said first bore through said sealing plug thereby allowing venting of said thruster engine through said outer cover attachment.

10. The system of claim 9, further comprising:

said outer cover attachment having a slidably mounted outer cover fitting plug and a biasing means for biasing said outer cover fitting plug;

an outer cover removably attachable at said outer cover fitting plug, said biasing means holding said outer cover against said thruster, said outer cover having deformable engagement surfaces for engaging said thruster nozzle.

11. The system of claim 10, further comprising:

a first threaded boss affixed to a shoulder upon said slidably mounted outer cover fitting plug;

a housing having a shoulder at one end for securing to said outer cover attachment, said housing having a second threaded boss affixed to said housing shoulder; and said biasing means for biasing said outer cover fitting plug including a spring, said spring having a first and a second end, said first end of said spring engaging said first threaded boss, and said second end of said spring engaging said second threaded boss.

12. The system of claim 10, further comprising:

a plurality of locators mounted to said outer cover around the periphery of said outer cover, said locators being in contact with an inner portion of said thruster nozzle and preventing lateral movement of said outer cover.

13. The system of claim 9, further comprising:

a relief valve within said sealing plug allowing venting through said first bore in said sealing plug; and an orifice within said second bore of said outer cover attachment, said orifice restricting fluid flow through said relief valve.

14. The system of claim 9, further comprising:

a relief valve in communication with said second bore through said outer cover attachment, said relief valve opening at an upper limit servicing pressure of said thruster motor for limiting the pressure within said second bore through said outer cover attachment.

15. The system of claim 9, wherein:

said insertion tool has a deformable material exterior surface.

16. The system of claim 9, wherein:

said insertion tool has a slidable engagement sleeve removably attachable to said sealing plug, said slidable engagement sleeve being slidable to collapse said collapsible portion of said sealing plug.

17. A system for sealing a thruster nozzle of a thruster engine, comprising:

a sealing plug for sealing a throat portion of said thruster nozzle, said sealing plug having a collapsible end portion with an outside collapsed diameter permitting insertion of said collapsible portion through said throat portion of said thruster, said sealing plug having a first bore therethrough;

a ferry vent attachment removably securable to said sealing plug, said ferry vent attachment having a body with inner walls defining a second bore in communication with said first bore in said sealing plug, said ferry vent attachment having a sleeve forming an annulus between said sleeve and said body in fluid communication with said first bore.

18. The system of claim 17, wherein:

said sealing plug includes a fitting;

a lock nut on said ferry vent attachment connectable to said fitting on said sealing plug for removably securing said ferry vent attachment to said sealing plug, a spring-loaded ball contained within a cavity in said lock nut; and a ferry vent attachment surrounding and slidably attached to said lock nut, said body having a detent, said lock nut spring-loaded ball riding along said body and engaging said detent to hold said lock nut in a fastened position.

19. The system of claim 17, further comprising:

a testing means operable for testing components of said thruster nozzle sealing system including said thruster plug and said ferry vent attachment.

* * * * *